United States Patent [19]

Kamiyama et al.

[11] 4,087,414

[45] May 2, 1978

[54] PROCESS FOR PRODUCING A FLAME RETARDANT ISOCYANURATE RESIN

[75] Inventors: Seiichi Kamiyama; Norio Nagai, both of Tokyo; Hiroaki Miyamoto, Matsudo, all of Japan

[73] Assignee: Mitsubishi Gas Chemical Company, Inc., Tokyo, Japan

[21] Appl. No.: 722,018

[22] Filed: Sep. 10, 1976

[30] Foreign Application Priority Data

Sep. 16, 1975 Japan .................... 50-111877

[51] Int. Cl.$^2$ .............................................. C08G 18/00
[52] U.S. Cl. ................ 260/77.5 NC; 260/18 TN; 260/18 PT; 260/47 CB; 260/47 EP; 260/77.5 R
[58] Field of Search ........... 260/77.5 NC, 77.5 R, 260/47 CB, 47 EP, 18 TN, 18 PT

[56] References Cited

U.S. PATENT DOCUMENTS

| 3,494,888 | 2/1970 | McElroy | 260/77.5 NC |
| 3,849,349 | 11/1974 | Frisch et al. | 260/77.5 NC |

*Primary Examiner*—Eugene C. Rzucidlo
*Attorney, Agent, or Firm*—Brooks, Haidt, Haffner & Delahunty

[57] ABSTRACT

A flame retardant isocyanurate resin is produced by polymerizing a polyfunctional isocyanate compound with a polyfunctional epoxy compound at a ratio of 0.05 - 0.2 equivalent of the polyfunctional epoxy compound per one equivalent of the polyfunctional isocyanate compound at a pressure of 1 - 800 kg/cm$^2$(gauge) at a temperature of 100° - 250° C in the presence of an organic isocyanate polymerization catalyst.

9 Claims, No Drawings

PROCESS FOR PRODUCING A FLAME RETARDANT ISOCYANURATE RESIN

BACKGROUND OF THE INVENTION

1. Field of the Invention

This invention relates to a process for producing a thermosetting isocyanurate resin, and more particularly, to a process for producing a flame retardant isocyanurate resin by the polymerization of a polyfunctional isocyanate compound.

2. Description of the Prior Art

It has been known heretofore that organic isocyanates are liable to polymerize. Linear polymers of polyfunctional isocyanate compounds are commercially useful products, and such polymers having isocyanato groups are widely used as an intermediate for polyurethane.

Various processes for producing isocyanurate resins by polymerizing polyfunctional isocyanate compounds were tried. The resulting isocyanurate resins obtained from a polyfunctional isocyanate compound alone are self-extinguishing, but not stable at an elevated temperature so that the resins are not yet of commercial usefulness.

Japanese Patent Application Laid Open No. 49-94798 discloses a process for producing a thermosetting resin having isocyanurate rings and oxazolidone rings by reacting one equivalent of a polyfunctional epoxy compound with 1.5 – 5 equivalents of a polyfunctional isocyanate compound. Japanese Patent Application Laid Open No. 50-63100 discloses the use of a thermosetting resin having isocyanurate rings and oxazolidone rings as an electric insulating material. In these prior art patents the polymerization requires a long time to become complete and the resulting resin has a low flame retardancy.

SUMMARY OF THE INVENTION

According to the present invention, there is provided a process for producing a flame retardant isocyanurate resin by polymerizing a polyfunctional isocyanate compound in the presence of an organic isocyanate polymerization catalyst which comprises polymerizing a polyfunctional epoxy compound with a polyfunctional isocyanate compound at a ratio of 0.05 – 0.2 equivalent of the polyfunctional epoxy compound per one equivalent of the polyfunctional isocyanate compound at a pressure of 1 – 800 Kg/cm$^2$ (gauge) at a temperature of 100° – 250° C.

An object of the present invention is to provide a process for producing a flame retardant isocyanurate resin having high heat stability and a high heat resistance and retaining a high self-extinguishing property.

Another object of the present invention is to provide a process for producing a flame retardant isocyanurate resin showing a weight loss of not more than 1 percent on heating at 200° C for 100 hours and classified to 94V-1 or better, and preferably to 94V-0, according to UL Standard 94.

DESCRIPTION OF THE PREFERRED EMBODIMENTS

The polyfunctional isocyanate compound used in the present invention is a compound having at least two isocyanato groups. The polyfunctional isocyanate compounds may be used as a combination of two or more of the compounds.

Typical polyfunctional isocyanate compounds are aliphatic polyfunctional isocyanate compounds such as hexamethylene diisocyanate, decamethylene diisocyanate and the like, and polyfunctional isocyanate compounds having an aromatic nucleus such a xylylene diisocyanate, phenylene diisocyanate, tolylene diisocyanate, biphenyl diisocyanate, toluidine diisocyanate, naphthylene diisocyanate, diphenylmethane diisocyanate, diphenyl ether diisocyanate, triphenylmethane triisocyanate, polymethylene polyphenylisocyanate represented by the following formula.

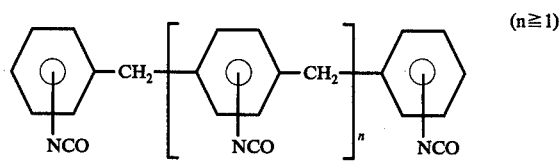

and the like.

In addition, polyfunctional isocyanate compounds as described in a paragraph at "Polyurethanes" in "Encyclopedia of Polymer Science and Technology," Vol. 11, pp. 506 – 563 (John Wiley and Sons, Inc., N.Y., 1969) may be used.

Preferable polyfunctional isocyanate compounds are xylylene diisocyanate, tolylene diisocyanate, naphthylene diisocyanate, diphenylmethane diisocyanate, polymethylene polyphenyl isocyanate, and a combination of an aliphatic polyfunctional isocyanate compound such as hexamethylene diisocyanate and the like and a polyfunctional isocyanate compound containing an aromatic nucleus.

The polyfunctional epoxy compound used in the present invention is a compound having at least two epoxy groups. The polyfunctional epoxy compound may be used in combination of two or more of the compounds.

Typical polyfunctional epoxy compounds are aliphatic polyfunctional epoxy compounds such as diglycidyl ether of butanediol, butadiene dioxide, diglycidyl ether of polyethylene glycol, triglycidyl ether of glycerol, and the like, alicyclic polyfunctional epoxy compounds such as vinylcyclohexene dioxide and the like, polyfunctional epoxy compounds having an aromatic nucleus such as diglycidyl ether of resorcinol,
diglycidyl ether of isopropylidene-diphenol (diglycidyl ether of bisphenol A),
polyglycidyl ether of phenol-formaldehyde novolac,
polyglycidyl ether of cresol-formaldehyde novolac, and
the like, triglycidyl isocyanurate, and
diglycidyl ether of dimer acid such as diglycidyl ether of linoleic dimer acid.

In addition, polyfunctional epoxy compounds as described in a paragraph at "Epoxy Resins" in "Encyclopedia of Polymer Science and Technology," Vol. 6, pp. 209 – 271 (John Wiley and Sons, Inc., N.Y. 1967) may be used.

Preferable polyfunctional epoxy compounds are diglycidyl ether of butanediol, diglycidyl ether of polyethylene glycol, diglycidyl ether of isopropylidenediphenol, polyglycidyl ether of phenol-formaldehyde novolac, polyglycidyl ether of cresol-formaldehyde novolac, and diglycidyl ester of linoleic dimer acid.

The equivalent ratio of the polyfunctional epoxy compound to the polyfunctional isocyanate compound is 0.05 – 0.2, and preferably 0.08 – 0.18. When the equivalent ratio is more than 0.2, many oxazolidone rings having lower flame retardancy than the isocyanurate ring are introduced into the polymer chain and, therefore, a flame retardant should be added to retain the self-extinguishing property, and the electrical properties are also poor. On the contrary, when the equivalent ratio is less than 0.05, the heat-stabilizing effect resulting from the addition of the polyfunctional epoxy compound is low.

The organic isocyanate polymerization catalysts used in the present invention may be a conventional organic ioscyanate trimerization catalyst, for example, metal salts of carboxylic acids such as sodium acetate, zinc octylate, lead octylate, lead naphthenate, stannous octoate and the like, alkali metal — or alkaline earth metal alkoxides such as sodium methoxide and the like, alkali metal — or alkaline earth metal phenoxides such as potassium phenoxide and the like, tertiary amines such as triethylamine, triethylenediamine, dimethylaminomethylphenol, methylmorpholine, pyridine and the like, quaternary ammonium compounds such as tetraethyl ammonium hydroxide and the like, imidazoles such as imidazole, 2-ethyl-4-methylimidazole and the like, and organometallic compounds containing tin or antimony, etc. such as tetraphenyl tin, tributyl antimony oxide and the like.

If desired, alcohols or secondary amines may be used as a polymerization promotor.

The amount of the catalyst is appropriately determined taking account of the activity of the catalyst. In general the amount of the catalyst is 0.05 – 5% by weight based on the total amount of the polyfunctional isocyanate compound and the polyfunctional epoxy compound.

In the present invention, as a modifier various organic compounds of a low molecular weight or of a high molecular weight other than the polyfunctional isocyanate compound and the polyfunctional epoxy compound may be used so as to improve the properties of the resulting isocyanurate resin or facilitate the polymerization reaction.

Representative modifiers are monofunctional isocyanate compounds, monofunctional epoxy compounds, phenols, amines, polyols, phenolic resins, xylene resins, alkyd resins, silicone resins and the like. Among them, monofunctional epoxy compounds and phenols are preferred.

In addition, reinforcing materials and fillers in the form of fiber or powder may be incorporated to the isocyanurated resin.

Examples of the reinforcing material and the filler are glass fiber, ceramic fiber, carbon fiber, polyester fiber, paper, finely divided silica, alumina, baked clay, asbestos and polyamide powder.

Further, various pigments may be added at the time of polymerization so as to color the resin.

In the present invention, the polymerization reaction is carried out by heating the reaction mixture under pressure at a temperature of 100° – 250° C, preferably at 150° – 220° C, to obtain the isocyanurate resin.

The reaction pressure is 1 – 800 Kg/cm$^2$ (gauge), preferably 10 – 800 Kg/cm$^2$ (gauge) and more preferably 30 – 600 Kg/cm$^2$ (gauge). The reaction under such pressure range gives an isocyanurate resin having a good appearance and a high heat stability.

The reason for such improved appearance and heat stability is not clearly understood. Although it is not desired to limit the invention to any particular theory, it is believed that the polymerization reaction under pressure suppresses a side reaction forming carbon dioxide which is undesirable for producing a flame retardant isocyanurate resin.

In the present invention, it is preferable to carry out a preliminary polymerization at a relatively low temperature such as 20° – 150° C before the polymerization.

The preliminary polymerization may be carried out by adding an organic isocyanate polymerization catalyst to the polyfunctional isocyanate compound and the polyfunctional epoxy compound and, if desired, adding a modifier, a reinforcing material and a filler, and then heating the reaction mixture at the said temperature in the presence or absence of an inert organic solvent.

The degree of the preliminary polymerization is such that the so obtained reaction mixture is not gelled and the subsequent polymerization and molding can be easily effected. In general the degree of the preliminary polymerization is 10 – 50% in terms of the isocyanato conversion.

Typical inert organic solvents are ketones such as acetone, methyl ethyl ketone and the like, esters such as ethyl acetate and the like, ethers such as dibutyl ether and the like, and amides such as dimethyl formamide and the like.

The preliminary polymerization product as obtained above may be used in the form of a solution or a liquid as an adhesive or as a material for molding, laminating or casting, and further may be used in a form of dried powder, resin-impregnated material or molding compound as a molding material. In this case, if desired, it is possible to incorporate a modifier, reinforcing material, filler, pigment or other additives as mentioned above to the preliminary polymerization product.

The preliminary polymerization product is polymerized by heating under pressure at 100° – 250° C.

Conventional isocyanurate resins produced by polymerizing only a polyfunctional isocyanate compound such as 4,4'-diphenylmethane diisocyanate show a high softening point, but are poor in heat stability. That is, when the conventional resins are kept at 200° C for a long period of time, gas foams are formed over the whole surface and the resins become opaque and the weight loss thereby is marked.

Resins produced by polymerizing a polyfunctional epoxy compound and a polyfunctional isocyanate compound at the equivalent ratio of more than 0.2 contain many oxazolidone rings and have a disadvantageously low softening point and are inflammable.

On the contrary, the isocyanurate resins produced in the present invention retain a self-extinguishing property and yet show a high heat stability and a high heat resistance; and have better electrical properties than epoxy resin.

According to the process of the present invention, there can be obtained a flame retardant isocyanurate resin having a weight loss of not more than 1 percent on heating at 200° C for 100 hours and classified to 94V-1 or better, preferably to 94V-0, according to UL Standard 94.

The isocyanurate resins produced according to the present invention are infusible by heat and insoluble in solvents, and have excellent flame retardancy, heat resistance, heat stability, chemical resistance, adhesivity, mechanical properties and electrical properties. In particular, one of the outstanding features of the isocyanaurate resins produced according to the present invention is their excellent flame retardancy as well as of excellent dielectric properties.

The isocyanurate resins as obtained by the process of the present invention may be used for producing compression molding articles, casting articles, laminating articles and adhesives, and are preferable for producing compression molding articles.

The present invention will be understood more readily by reference to the following examples. However, these examples are intended to illustrate the invention and are not to be construed to limit the scope of the invention. Unless otherwise stated, parts are parts by weight.

The flame-retarding effects of the resin were evaluated according to the UL Standard 94 of the United States, using test pieces of 3.2 mm thickness. Material classed 94V-0 and 94V-1 shall not have any specimens which burn with flaming combustion for more than 10 seconds and 30 seconds, respectively, after each application of the test flame, and shall not have a total flaming combustion time exceeding 50 seconds and 250 seconds, respectively, for the 10 flame applications for each set of 5 specimens.

EXAMPLE 1

Diphenylmethane diisocyanate (Millionate MR, a trade name for a product of Nippon Polyurethane Co., the isocyanato equivalent : 136, viscosity : 200 cp/25° C) and diglycidyl ether of bisphenol A (Epikote 828, a trade name for a product of Shell Chemical Co., epoxy equivalent : 190, viscosity : 15000 cp/25° C) were mixed with each other in various ratios given in the following table. To 100 parts of the resulting mixture, 1.0 part of N-methyl morpholine was added, and the mixture was heated at 70° C and preliminary polymerization was carried out to obtain a viscous prepolymer having an isocyanato conversion of 30–40%. 200 parts of finely powdered silica was added to the prepolymer, which was kneaded with a roll and finely pulverized to prepare a molding material. The molding material thus obtained was placed in a mold, and the polymerization was started under conditions such that the temperature was 150° C and the gauge pressure was 500 Kg/cm² (gauge), and then the temperature was raised up to 200° C over a period of 30 minutes and remained at the same temperature for a further two hours to effect the polymerization reaction. The isocyanurate resin thus obtained was brown and opaque. The following table shows the properties of the resins obtained.

The resin had a Vicat softening point of 186° C and a weight loss on heating of 1.1%, and had further a poor heat stability and had gas foams over the whole surface.

COMPARISON EXAMPLE 2

The same procedure as in Example 1 was repeated except that the diphenylmethane diisocyanate and diglycidyl ether of bisphenol A were used in amounts of 70.5 parts and 29.5 parts (epoxy equivalent/isocyanato equivalent : 0.30), respectively.

The resulting isocyanurate resin had a total flaming combustion time of 160 sec. and a maximum flaming combustion time of 42 sec. and further it falls in class 94V-2. In addition, the product had a dielectric constant ($\epsilon$) of 3.2 and a dielectric tangent (tan $\delta$) of 0.0036.

EXAMPLE 2

83.4 parts of diphenylmethane diisocyanate (Millionate MR, a trade name) and 16.6 parts of the polyglycidyl ether of phenolformaldehyde novolac (Epikote 154, a trade name for a product of Shell Chemical Co., epoxy equivalent : 180, viscosity: 50000 cp/52° C) were mixed with each other. (epoxy equivalent/isocyanato equivalent : 0.15.) 0.5 part of N,N-dimethylbenzylamine was added to the mixture, which was heated at 80° C and preliminarily polymerized to obtain a viscous prepolymer having an isocyanato conversion of 38%. The prepolymer was diluted with methyl ethyl ketone and impregnated into glass fiber sheets, which were heated at 120° C to obtain prepregs. The prepregs thus obtained were piled one upon another and laminated for 2 hours under the conditions such that the temperature was 180° C and the pressure 50 Kg/cm² (gauge), and a laminated article having a resin content of 36% was obtained. The properties of the laminated article were tested similarly to Example 1. As the result of the test, the laminated article was found to have a density of 1.80 g/cm³, a weight loss on heating of 0.6%, a total flaming combustion time of 72 seconds and to be classified to 94V-1 according to UL Standard 94.

EXAMPLE 3

86.8 parts of 4,4'-diphenylmethane diisocyanate (isocyanato equivalent : 125, melting point : 380° C) and 13.2 parts of diglycidyl ether of bisphenol A (Epikote 828, a trade name) were mixed with each other (epoxy equivalent/isocyanato equivalent : 0.10). 1.0 parts of triethylenediamine was then added to the mixture and further 200 parts of finely divided silica was added. The Table

| Starting materials | | | Properties of resin | | | | | | |
|---|---|---|---|---|---|---|---|---|---|
| Diphenyl-methane diisocyanate (part) | Diglycidyl ether of bisphenol A (part) | Epoxy equivalent Isocyanato equivalent | Density (g/cm³) | Vicat* softening point (° C) | Weight loss on heating at 200° C for 100 hrs. (%) | Burning test by UL Standard 94 | | Electric properties (10 KHz) | |
| | | | | | | Flaming combustion time (sec.) | Class of flammability | Dielectric constant ($\epsilon$) | Dielectric tangent (tan $\delta$) |
| 93.5 | 6.5 | 0.05 | 1.84 | 204 | 0.8 | 6 | 94V-0 | 2.8 | 0.0027 |
| 87.7 | 12.3 | 0.10 | 1.83 | 240 | 0.7 | 14 | 94V-0 | 2.8 | 0.0028 |
| 82.7 | 17.3 | 0.15 | 1.82 | 254 | 0.6 | 32 | 94V-0 | 2.9 | 0.0030 |
| 78.2 | 21.8 | 0.20 | 1.82 | 261 | 0.5 | 70 | 94V-1 | 3.0 | 0.0032 |

*The Vicat softening point was measured in accordance with DIN 57302.

COMPARISON EXAMPLE 1

The same procedure as in Example 1 was repeated except that diphenylmethane diisocyanate alone was used without using an diglycidyl ether of bisphenol A to obtain isocyanurate resin.

resulting mixture was kneaded with a roll at 70° C and then finely pulverized to obtain a molding material. The molding material thus obtained was polymerized under the same conditions as in Example 1 to obtain a light brown and opaque resin. The properties of the polymer were tested. The resulting density was 1.82 g/cm³, the Vicat softening point 252° C, the weight loss on heating 0.8%, the total flaming combustion time 12 seconds and UL Standard 94 class 94V-0.

EXAMPLE 4

66.4 parts of 4,4'-diphenylmethane diisocyanate and 16.6 parts of hexamethylene diisocyanate (total isocyanato equivalent : 84) and 17 parts of diglycidyl ether of bisphenol A (Epikote 1001, a trade name for a product of Shell Chemical Co., epoxy equivalent : 475, melting point : 70° C) were mixed with one another (epoxy equivalent/isocyanato equivalent : 0.05); 1.0 part of dimethylethanolamine was added to the mixture, which was then heated at 80° C and preliminarily polymerized to obtain a viscous prepolymer having an isocyanato conversion of 32%. The prepolymer was diluted with methyl ethyl ketone and impregnated into glass fiber sheets and further heated at 140° C to obtain prepregs. The prepregs thus obtained were piled one upon another and laminated under the same conditions as in Example 2 to obtain a laminated article having a resin content of 35%. The laminated articles density was 1.72 g/cm$^3$, the weight loss on heating 0.7%, total flaming combustion time 90 seconds and UL Standard 94 class 94V-1.

EXAMPLE 5

76.3 parts of tolylene diisocyanate isomeric mixture (2,4-substituted one : 80%, 2,6-substituted one : 20%, isocyanato equivalent : 87) and 23.7 parts of polyglycidyl ether of phenol-formaldehyde novolac (Epikote 154, a trade name for a product of Shell Chemical Co.) were mixed with each other. (epoxy equivalent/isocyanato equivalent : 0.15) 3.0 parts of lead octylate (lead content : 38%) was added thereto, and the resulting mixture was heated at 100° C and preliminarily polymerized to obtain a viscous prepolymer having an isocyanato conversion of 45%. 200 parts of finely divided silica was added to the prepolymer, which was then kneaded with a roll at 50° C and finely pulverized to obtain a molding material. The molding material was placed in a mold and polymerized for two hours under the conditions such that the temperature was 200° C and the pressure 300 Kg/cm$^2$ (gauge). As the result, a light brown and opaque resin was obtained. The property of the resin was that the density was 1.84 g/cm$^2$, the Vicat softening point 257° C, the weight loss on heating 0.8%, the total flaming combustion time 54 seconds and UL Standard 94 class 94V-1.

EXAMPLE 6

0.5 part of tin octylate was added to 91.5 parts of xylylene diisocyanate (isocyanato equivalent : 94). The resulting mixture was heated at 100° C and preliminarily polymerized to obtain a viscous prepolymer having an isocyanato conversion of 48%. 8.5 parts of diethylene glycol diglycidyl ether (epoxy equivalent : 87) and 0.5 part of triethylenediamine were added to the prepolymer (epoxy equivalent/isocyanato equivalent : 0.1). The mixture thus obtained was placed in a mold and polymerized for 2 hours under conditions such that the temperature was 180° C and the pressure was 50 Kg/cm$^2$ (gauge) to obtain a light yellow transparent resin. The resins density was 1.30 g/cm$^3$, the Vicat softening point 202° C, the weight loss on heating 1.0%, the total flaming combustion time 84 seconds and UL Standard 94 class 94V-1.

COMPARISON EXAMPLE 3

The same procesure as in Example 6 was repeated except that 78.3 parts of xylylene diisocyanate and 21.7 parts of diglycidyl ether of diethylene glycol were used. (epoxy equivalent/isocyanato equivalent : 0.3). The resulting resins density was 1.25 g/cm$^3$, the Vicat softening point 174° C, the weight loss on heating 1.7%, and it was not self-extinguishing and did not fall in class 94V-1.

EXAMPLE 7

86.1 parts of polymethylene polyphenylisocyanate (PAPI, a trade name for a product of Kasei Upjohn Co., isocyanato equivalent : 133, viscosity : 250 cp/25° C) and 13.9 parts of diglycidyl ester of linoleic dimer acid (Epikote 871, a trade name for a product of Shell Chemical Co., epoxy equivalent : 430, viscosity : 700 cp/25° C) were mixed with each other (epoxy equivalent/isocyanato equivalent : 0.2). 1.0 parts of 2-ethyl-4-methylimidazole was further added. The resulting mixture was diluted with methyl ethyl ketone and impregnated into glass fiber sheets and further heated at 120° C to obtain prepregs. These prepregs were piled and laminated for 2 hours under conditions such that the temperature was 200° C and the pressure was 100 Kg/cm$^2$ (gauge) to obtain a laminated article having a resin content of 39%. The laminated article was 1.70 g/cm$^2$ in density, 0.8% in weight loss on heating, 64 seconds in total flaming combustion time and was to be classified to 94V-1 in UL Standard 94.

EXAMPLE 8

77.8 parts of polymethylene polyphenyl isocyanate (PAPI, a trade name) and 22.2 parts of diglycidyl ether of bisphenol A (Epikote 828, a trade name) were mixed (epoxy equivalent/isocyanato equivalent : 0.2), and 2.0 parts of imidazole was added thereto. The resulting mixture was heated at 90° C and preliminarily polymerized to obtain a viscous prepolymer having an isocyanato conversion of 35%. 250 parts of fused quartz glass powder and 1.0 part of γ-glycidoxypropyltrimethoxysilane as a silane coupling agent were added to the prepolymer, which was then kneaded with a roll at 80° C and finely pulverized. The molding material thus obtained was polymerized for 30 minutes under conditions such that the temperature was 200° C and the pressure was 100 Kg/cm$^2$ (gauge) so that a brown opaque resin was obtained.

The resin was 1.80 g/cm$^3$ in density, 274° C in Vicat softening point, 0.5% in weight loss on heating, 88 seconds in total flaming combustion time, 94V-1 in UL Standard 94, 32 seconds in dielectric constant ($\epsilon$), 0.003 in dielectric tangent (tan $\delta$) and 5 × 10$^{15}$ ohm.cm in volume resistivity and further when treated in water at 70° C for 1000 hours, 3.6 in dielectric constant, 0.030 in dielectric tangent, 2 × 10$^{13}$ ohm.cm in volume resistivity and had an excellent water resistance.

EXAMPLE 9

The same procedure as in Example 1 was repeated except that 87.7 parts of diphenylmethane diisocyanate (Millionate MR, a trade name) and 12.3 parts of diglycidyl ether of bisphenol A (Epikote 828, a trade name) were used (epoxy equivalent/isocyanato equivalent : 0.1) and 5.0 parts of phenylglycidyl ether was used as a modifier.

Properties of the resin thus obtained were as follows:

| | |
|---|---|
| Density | 1.81 g/cm$^3$ |
| Vicat softening point | 250° C |
| Weight loss on heating | 0.7% |
| Total flaming combustion time | 48 sec. |
| UL Standard 94 | 94V-1 |

EXAMPLE 10

The same procedure as in Example 1 was repeated except that 87.7 parts of diphenylmethane diisocyanate (Millionate MR, a trade name) and 12.3 parts of diglycidyl ether of bisphenol A (Epikote 828, a trade name) were used (epoxy equivalent/isocyanato equivalent : 0.1) and 5.0 parts of p-cresol was used as a modifier.

Properties of the resin thus obtained were as follows:

| | |
|---|---|
| Density | 1.80 g/cm$^3$ |
| vicat softening point | 246° C |
| Weight loss on heating | 0.8% |
| Total flaming combustion time | 70 sec. |
| UL Standard 94 | 94V-1 |

EXAMPLE 11

87.0 parts of liquid diphenylmethane diisocyanate (Isonate 143L, a trade name for a product of Kasei Upjohn Co., isocyanato equivalent : 144, viscosity : 30 cp/25° C) and 13.0 parts of polyglycidyl ether of cresol — formaldenhyde novolac (Araldite ECN 1235, a trade name for a product of Ciba-Geigy A.G., epoxy equivalent : 215, melting point : 35° C) were mixed with each other (epoxy equivalent/isocyanato equivalent : 0.1) and 1.0 part of N,N-dimethylbenzylamine was added thereto. The resulting mixture was heated at 80° C and preliminarily polymerized to obtain a viscous prepolymer having an isocyanato conversion of 38%. 250 parts of finely divided silica was added to the prepolymer, which was then kneaded with a roll at 70° C and finely pulverized. The molding material thus obtained was polymerized for 5 hours under conditions such that the temperature was 150° C and the pressure was 800 Kg/cm$^2$ (gauge) to obtain a light brown opaque resin. Properties of the resin thus obtained were as follows:

| | |
|---|---|
| Density | 1.95 g/cm$^3$ |
| Vicat softening point | 270° C |
| Weight loss on heating | 0.6% |
| Total flaming combustion time | 24 sec. |
| UL Standard 94 | 94V-0 |

EXAMPLE 12

81.2 parts of tolylene diisocyanate isomeric mixture (2,4-substituted one : 80%, 2,6-substituted one : 20%) and 18.8 parts of diglycidyl ether of 1,4-butanediol (epoxy, equivalent : 101) were mixed (epoxy equivalent-/isocyanato equivalent : 0.2) and 2.0 parts of imidazole was added thereto. The resulting mixture was heated at 80° C and preliminarily polymerized to obtain a viscous prepolymer having an isocyanato conversion of 36%. The prepolymer was diluted with methyl ethyl ketone and impregnated into glass fiber sheets and further heated at 120° C to obtain prepregs. These prepregs were piled and laminated for 1 hour under conditions such that the temperature was 220° C and the pressure was 30 Kg/cm$^2$ (gauge) to obtain a laminated article having a resin content of 33%. Properties of the laminated article were as follows:

| | |
|---|---|
| Density | 1.75 g/cm$^3$ |
| Weight loss on heating | 0.9% |
| Total flaming combustion time | 110 sec. |
| UL Standard 94 | 94V-1 |

What is claimed is:

1. A process for producing a flame retardant isocyanurate resin by polymerizing an isocyanate compound having a plurality of isocyanate groups in the presence of an organic isocyanate polymerization catalyst, which process comprises polymerizing an epoxy compound having a plurality of epoxy groups with an isocyanate compound which is at least one member selected from the group consisting of hexamethylene diisocyanate, decamethylene diisocyanate, xylylene diisocyanate, phenylene diisocyanate, tolylene diisocyanate, biphenyl diisocyanate, toluidine diisocyanate, naphthylene diisocyanate, diphenylmethane diisocyajate, diphenyl ether diisocyanate, triphenylmethane triisocyanate, and polymethylene polyphenylisocyanate, in a ratio of 0.05–0.2 equivalent of the epoxy compound per equivalent of the isocyanate compound at a pressure of from 10 to 800 Kg/cm$^2$ (gauge) at a temperature of from 100° to 250° C.

2. A process according to claim 1 in which 0.08–0.18 equivalent of the epoxy compound is used per one equivalent of the isocyanate compound.

3. A process according to claim 1 in which the polymerization is carried out at from 150° to 220° C.

4. A process according to claim 1 in which the polymerization is carried out after a preliminary polymerization effected at from 20° to 150° C.

5. A process according to claim 1 in which the polymerization is carried out at from 30 to 600 Kg/cm$^2$ (gauge).

6. A process according to claim 1 in which the isocyanate compound is at least one member selected from the group consisting of xylylene diisocyanate, tolylene diisocyanate, naphthylene diisocyanate, diphenylmethane diisocyanate, and polymethylene polyphenylisocyanate.

7. A process according to claim 1 in which a combination of hexamethylene diisocyanate and at least one member selected from the group consisting of xylylene diisocyanate, tolylene diisocyanate, biphenyl diisocyanate, tolidine diisocyanate, naphthylene diisocyanate, diphenylmethane diisocyanate, diphenyl ether diisocyanate, triphenylmethane triisocyanate and polymethylene polyphenylisocyanate is used as the isocyanate compound.

8. A process according to claim 1 in which the epoxy compound is at least one member selected from the group consisting of diglycidyl ether of butanediol, butadiene dioxide, vinylcyclohexene dioxide, diglycidyl ether of polyethylene glycol, triglycidyl ether of glycerol, diglycidyl ether of resorcinol, diglycidyl ether of isopropylidene diphenol, polyglycidyl ether of phenol-formaldehyde novolac, polyglycidyl ether of cresol-formaldehyde novolac, triglycidyl isocyanurate, and diglycidyl ester of dimer acid.

9. A process according to claim 1 in which the epoxy compound is at least one member selected from the group consisting of diglycidyl ether of butanediol, diglycidyl ether of polyethylene glycol, diglycidyl ether of isopropylidene diphenol, polyglycidyl ether of phenolformaldehyde novolac, polyglycidyl ether of cresolformaldehyde novolac, and diglycidyl ester of dimer acid.

* * * * *

UNITED STATES PATENT AND TRADEMARK OFFICE
CERTIFICATE OF CORRECTION

PATENT NO. : 4,087,414
DATED : May 2, 1978
INVENTOR(S) : SEIICHI KAMIYAMA ET AL

It is certified that error appears in the above-identified patent and that said Letters Patent are hereby corrected as shown below:

Title page, Abstract, line 6, change "kg" to --Kg--.

Column 2, line 5, change "a" to --as--.

Column 4, line 68, correct the spelling of "isocyanurate".

Column 6, line 32, delete "the" (first occurrence).

Column 7, line 43, delete "the" (first occurrence).

Column 9, line 30, correct the spelling of "formaldehyde".

Column 10, line 19, correct the spelling of "diisocyanate".

Signed and Sealed this

Third Day of October 1978

[SEAL]

Attest:

RUTH C. MASON
*Attesting Officer*

DONALD W. BANNER
*Commissioner of Patents and Trademarks*